(12) United States Patent
Kubota et al.

(10) Patent No.: US 9,452,656 B2
(45) Date of Patent: Sep. 27, 2016

(54) DAMPER CONTROL APPARATUS
(71) Applicant: KAYABA INDUSTRY CO., LTD., Tokyo (JP)
(72) Inventors: Tomoo Kubota, Kanagawa (JP); Masatoshi Okumura, Gifu (JP)
(73) Assignee: KYB Corporation, Tokyo (JP)
( * ) Notice: Subject to any disclaimer, the term of this patent is extended or adjusted under 35 U.S.C. 154(b) by 0 days.
(21) Appl. No.: 14/443,074
(22) PCT Filed: Mar. 10, 2014
(86) PCT No.: PCT/JP2014/056150
§ 371 (c)(1),
(2) Date: May 15, 2015
(87) PCT Pub. No.: WO2014/142065
PCT Pub. Date: Sep. 18, 2014
(65) Prior Publication Data
US 2016/0031286 A1    Feb. 4, 2016
(30) Foreign Application Priority Data

Mar. 13, 2013   (JP) ................................. 2013-050130

(51) Int. Cl.
*B60G 17/015* (2006.01)
*B60G 17/0165* (2006.01)
*B60G 17/018* (2006.01)
*B60G 17/08* (2006.01)
(52) U.S. Cl.
CPC ......... *B60G 17/018* (2013.01); *B60G 17/0152* (2013.01); *B60G 17/08* (2013.01); *B60G 2400/202* (2013.01); *B60G 2400/252* (2013.01); *B60G 2400/91* (2013.01); *B60G 2500/10* (2013.01); *B60G 2600/18* (2013.01); *B60G 2600/188* (2013.01)
(58) Field of Classification Search
CPC B60G 17/018; B60G 17/0152; B60G 17/08; B60G 2600/18; B60G 2600/188; B60G 2400/202; B60G 2400/91; B60G 2400/252; B60G 2500/10
See application file for complete search history.

(56) References Cited

U.S. PATENT DOCUMENTS

| | | | | |
|---|---|---|---|---|
| 5,410,482 | A * | 4/1995 | Kimura | B60G 17/0152 280/5.514 |
| 7,333,882 | B2 * | 2/2008 | Uchino | B60G 17/016 267/136 |
| 8,265,825 | B2 * | 9/2012 | Kajino | B60G 17/0157 280/124.108 |
| 2008/0009992 | A1 | 1/2008 | Izawa et al. | |
| 2009/0319123 | A1 * | 12/2009 | Nardi | B60G 17/018 701/37 |
| 2014/0309883 | A1 * | 10/2014 | Kikuchi | B60G 17/0162 701/40 |

FOREIGN PATENT DOCUMENTS

| | | |
|---|---|---|
| JP | 03-099919 A | 4/1991 |
| JP | 06-247121 A | 9/1994 |
| JP | 2002-144837 A | 5/2002 |
| JP | 2007-210590 A | 8/2007 |
| JP | 2007-302211 A | 11/2007 |
| JP | 2012-192805 | * 10/2012 |

* cited by examiner

*Primary Examiner* — Michael J Zanelli
(74) *Attorney, Agent, or Firm* — Rabin & Berdo P.C.

(57) ABSTRACT

A damper control apparatus damps vibration of an unsprung member by controlling a damping force of a damper in a vehicle, the damper being interposed between a sprung member and the unsprung member. The damper control apparatus includes a vibration level detecting unit that detects a vibration level serving as a magnitude of the vibration of the unsprung member, and a stroke speed detecting unit that detects a stroke speed of the damper. The damper control apparatus further includes a command value calculating unit that determines a control command value, the control command value is a command value for controlling the damping force of the damper on the basis of the vibration level of the unsprung member and the stroke speed of the damper.

13 Claims, 8 Drawing Sheets

DAMPER CONTROL APPARATUS

TECHNICAL FIELD

The present invention relates to a damper control apparatus.

BACKGROUND ART

A conventional damper control apparatus controls a damping force of a damper interposed between a sprung member and an unsprung member of a vehicle. The damper control apparatus controls the damping force of the damper by focusing on an expansion/contraction displacement and an expansion/contraction speed of the damper, for example. This type of damper control apparatus suppresses rattling of the unsprung member by determining whether the damper is decelerating or accelerating, and increasing a control gain so that the damper generates a large damping force when the damper is decelerating. When the damper is accelerating, on the other hand, the damper control apparatus improves a road surface following performance of the unsprung member by reducing the control gain so that the damper generates a small damping force. As a result, passenger comfort in the vehicle is improved (see JP2007-210590A).

A different type of damper control apparatus controls the damping force of the damper by focusing on a frequency and an amplitude of an expansion/contraction acceleration of the damper, for example. This type of damper control apparatus improves the passenger comfort of the vehicle by determining a road surface condition, selecting an appropriate damping force map for the road surface condition, and controlling the damping force of the damper in accordance with the selected damping force map (see JP2002-144837A).

SUMMARY OF INVENTION

Although the damper control apparatuses described above use different control methods, both improve the passenger comfort of the vehicle by performing control that is appropriate for a vibration condition of the unsprung member.

With the technique disclosed in JP2007-210590A, however, a damping force target value is simply determined by multiplying the expansion/contraction speed by the expansion/contraction displacement and then multiplying a resulting value by a control gain that is commensurate with the value, without taking the magnitude of the vibration into account. Likewise with the technique disclosed in JP2002-144837A, the damping force is simply increased by increasing a current command steadily as the road surface deteriorates. With the damper control apparatuses described above, therefore, control corresponding to the magnitude of the vibration of the unsprung member is not performed, leaving room for improvement in the passenger comfort of the vehicle.

It is therefore an object of the present invention to provide a damper control apparatus that improves passenger comfort in a vehicle.

A damper control apparatus according to an embodiment of the present invention is configured to damp vibration of an unsprung member by controlling a damping force of a damper in a vehicle, the damper being interposed between a sprung member and the unsprung member. The damper control apparatus includes a vibration level detecting unit configured to detect a vibration level, the vibration level serving as a magnitude of vibration of the unsprung member, and a stroke speed detecting unit configured to detect a stroke speed of the damper. The damper control apparatus also includes a command value calculating unit configured to determine a control command value on the basis of the vibration level of the unsprung member and the stroke speed of the damper, the control command value being a command value for controlling the damping force of the damper.

DESCRIPTION OF EMBODIMENTS

An embodiment of the present invention will be described below with reference to the attached figures.

Figure 1:
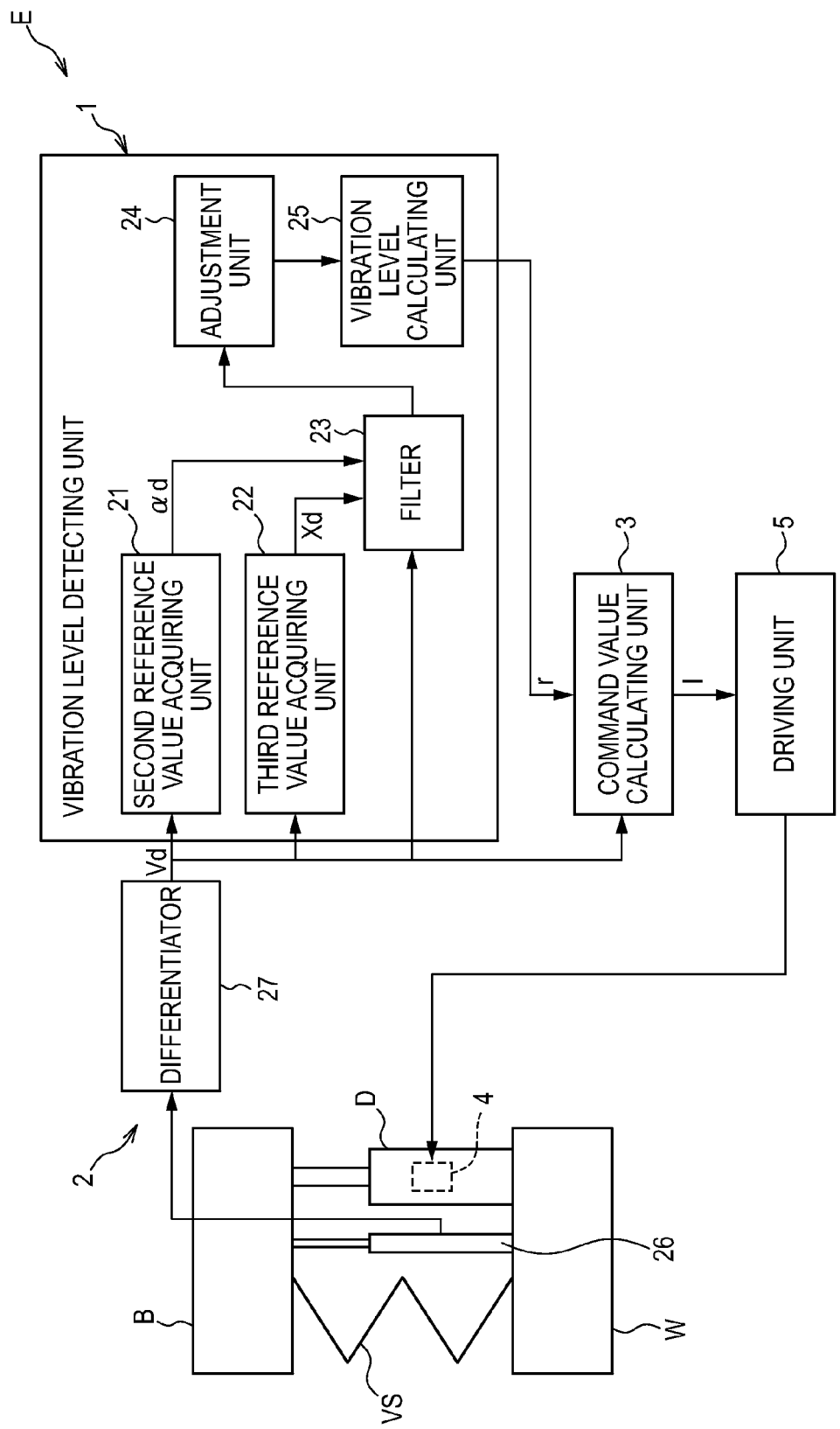
FIG. 1 is a view showing a configuration of a damper control apparatus according to an embodiment of the present invention.

In this embodiment, as shown in FIG. 1, a damper control apparatus E controls a damping force generated by a damper D provided in a vehicle. The damper D is interposed between a sprung member B and an unsprung member W constituting the vehicle. The damper D includes a damping force adjustment unit 4 that generates the damping force in response to an expansion/contraction operation of the damper D.

The damper control apparatus E includes a vibration level detecting unit 1 that detects a vibration level r indicating a magnitude of vibration of the unsprung member W, and a stroke speed detecting unit 2 that detects a stroke speed Vd of the damper D. The damper control apparatus E also includes a command value calculating unit 3 that determines a control command value I on the basis of the vibration level r of the unsprung member W, the vibration level r being detected by the vibration level detecting unit 2, the control command value I being a command line for controlling the damping force of the damper D, and the stroke speed Vd of the damper D, detected by the stroke speed detecting unit 2. The damper control apparatus E further includes a driving unit 5 that supplies a current to the damping force adjustment unit 4 in accordance with the control command value I determined by the command value calculating unit 3.

In this example, the damper D is provided in the vehicle so as to be interposed between the sprung member B and the unsprung member W and disposed parallel to a suspension spring VS. The sprung member B is elastically supported by the suspension spring VS. The unsprung member W includes a vehicle wheel and a link, which are attached to the sprung member B to be capable of swinging.

Figure 2:
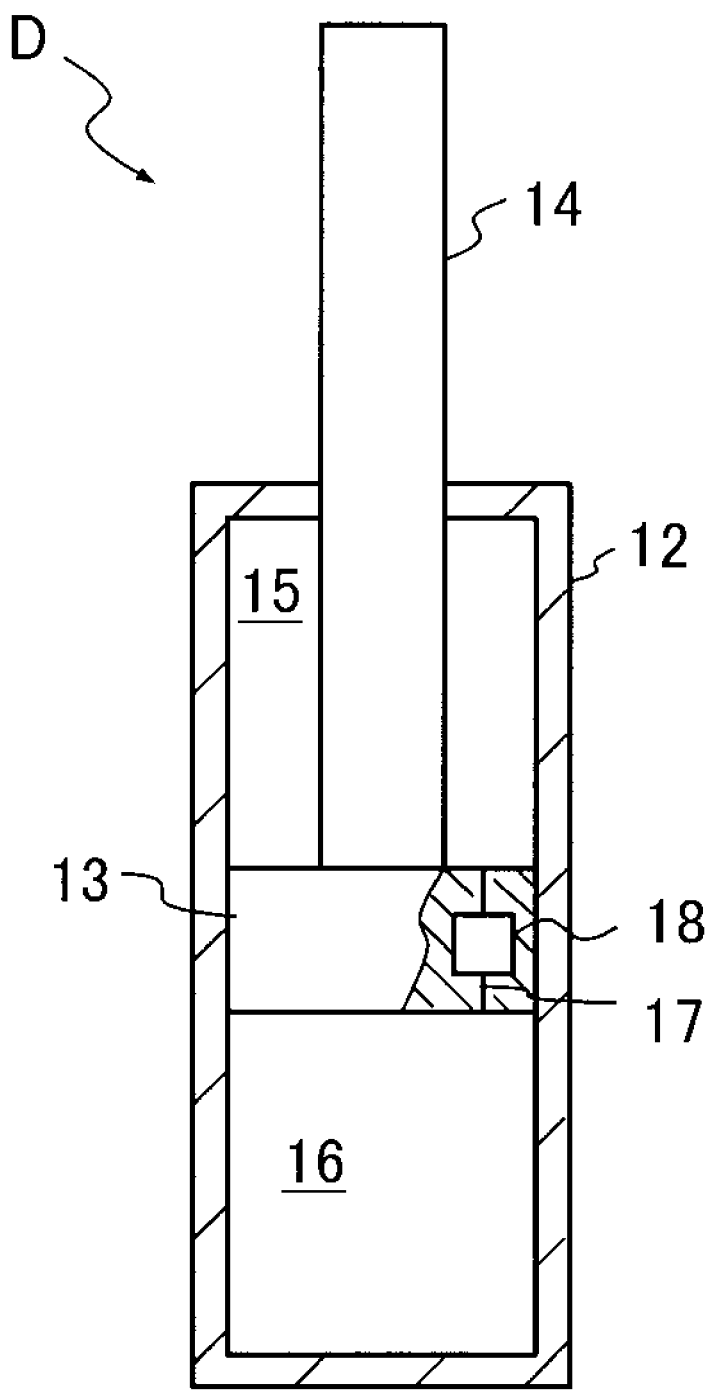
FIG. 2 is a view illustrating a system of an object serving as a detection subject.

As shown in FIG. 2, the damper D is constituted by a fluid pressure damper, for example.

In FIG. 2, the damper D includes a cylinder 12, a piston 13 inserted into the cylinder 12 to be free to slide, and a piston rod 14 inserted into the cylinder 12 to be free to move and coupled to the piston 13. The damper D further includes two pressure chambers 15 and 16 defined within the cylinder 12 by the piston 13, a passage 17 connecting the respective pressure chambers 15 and 16 to each other, and the damping force adjustment unit 4, which applies a resistance force to a flow of fluid passing through the passage 17. With this configuration, the damper D forms a fluid pressure damper.

When fluid charged into the pressure chambers 15 and passes through the passage 17 in response to an expansion/contraction operation of the damper D, resistance is applied to the fluid passing through the passage 17 by the damping force adjustment unit 4. Accordingly, a damping force for suppressing the expansion/contraction operation of the damper D is generated, and as a result, relative movement between the sprung member B and the unsprung member W can be suppressed.

In this example, a magnetorheological fluid is used as the fluid charged into the pressure chambers 15 and 16. The damping force adjustment unit 4 is configured to be capable of applying a magnetic field to the passage 17, and adjusts the magnitude of the magnetic field applied to the passage 17 in accordance with a current amount supplied thereto from the driving unit 5 of the damper control apparatus E. Accordingly, the resistance force applied to the flow of magnetorheological fluid passing through the passage 17 varies, and as a result, the damping force of the damper D can be varied.

Hence, the damper control apparatus E controls the damping force of the damper D by increasing and reducing the current supplied to the damping force adjustment unit 4.

It should be noted that when an electrorheological fluid is used as the fluid, the damping force adjustment unit 4 may be configured to be capable of applying an electric field to the passage 17. For example, the damping force adjustment unit 4 varies the damping force generated by the damper D by adjusting the magnitude of the electric field in accordance with a voltage supplied thereto from the damper control apparatus E so as to vary the resistance force applied to the fluid flowing through the passage 17.

Furthermore, working oil, water, an aqueous solution, a gas, and so on may be used as the fluid instead of the magnetorheological fluid or electrorheological fluid described above. In these cases, the damping force adjustment unit 4 is constituted, for example, by a damping valve that varies a flow passage area of a passage (not shown) newly provided in the damper D, and an actuator having a high control response, such as a solenoid, that can adjust the flow passage area of the passage by driving a valve body of the damping valve. The damper control apparatus E adjusts the flow passage area of the passage by increasing and reducing a current amount applied to the actuator, with the result that the resistance force applied to the fluid flowing through the passage varies. In so doing, the damper control apparatus E can adjust the damping force generated by the damper D.

Further, when the fluid is a liquid and the damper D is a single rod type damper, a gas chamber, a reservoir, and so on are provided in the damper D to compensate for a volume by which the piston rod 14 enters and exits the cylinder 12. When a gas is used as the fluid instead of a liquid, the gas chamber, reservoir, and so on need not be provided.

Alternatively, a uniflow type damper may be used as the damper D. In this case, a reservoir is provided in the damper D, and the damper D is configured such that the fluid is discharged from the interior of the cylinder 12 through a passage communicating with the reservoir during both expansion and contraction of the damper D. The damping force adjustment unit 4 is provided midway in the passage extending from the cylinder 12 to the reservoir, and the damping force is generated by applying resistance to the flow of the fluid.

Furthermore, an electromagnetic damper that generates the damping force for suppressing relative movement between the sprung member B and the unsprung member W using an electromagnetic force may be used as the damper D instead of the configurations described above. For example, the electromagnetic damper may be constituted by a motor and a motion conversion mechanism that converts a rotary motion of the motor into a linear motion, or by a linear motor. When the damper D is an electromagnetic damper, the damping force adjustment unit 4 functions as a motor driving apparatus that adjusts a current flowing to the motor or the linear motor.

The vibration level detecting unit 1, the command value calculating unit 3, and the damping force adjustment unit 4 will now be described.

First, the vibration level detecting unit 1 will be described in detail. To simplify the description, a principle of a method used by the vibration level detecting unit 1 to detect the vibration level of the unsprung member W will be described.

Figure 3:
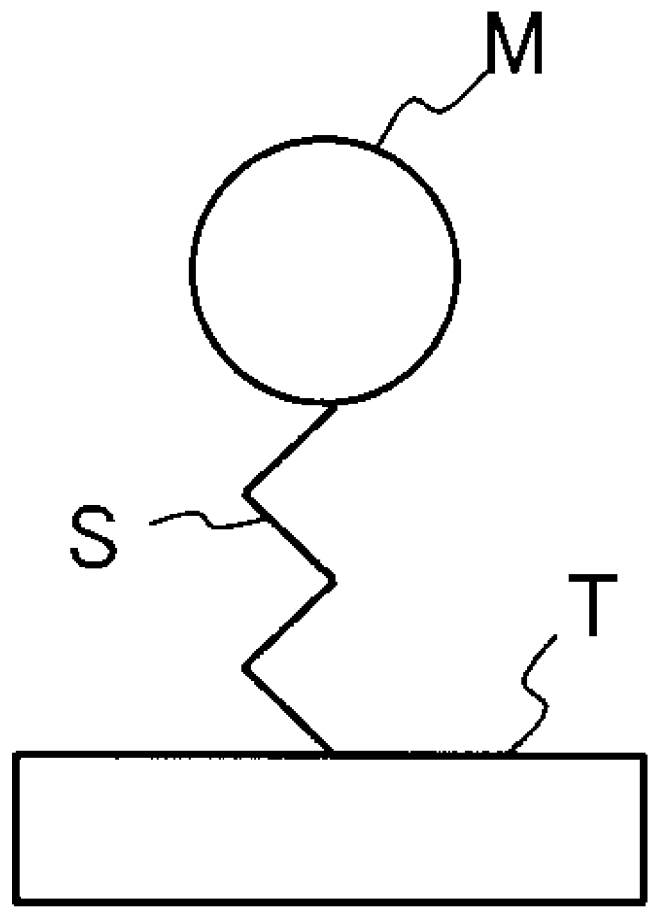
FIG. 3 is a view showing a configuration of a vibration level detecting unit.

First, a case in which the vibration level of an object M is detected by the vibration level detecting unit 1 in a system shown in FIG. 3, in which the object M is supported by a spring S, will be considered. FIG. 3 shows a spring mass system in which the object M is supported elastically from below in the figure by the spring S, which is attached vertically to a base T.

Here, a method of detecting an overall vibration level of the object M in an up-down direction of FIG. 3, or in other words an orthogonal direction to a plane of the base T, will be described. To detect the up-down direction vibration level of the object M, it is necessary to obtain an up-down direction speed of the object M, set the obtained value as a first reference value a, and obtain a second reference value b corresponding to a differential value or an integral value of the first reference value a. The vibration level r of the unsprung member W is then determined using the first reference value a and the second reference value b.

In a case where the first reference value a is set as the up-down direction speed of the object M, the up-down direction speed of the object M may be obtained by, for example, attaching an acceleration sensor to the object M, detecting an up-down direction acceleration of the object M using the acceleration sensor, and integrating the detected up-down direction acceleration.

When an up-down direction displacement of the object M corresponding to the integral value of the first reference value a is set as the second reference value b, the up-down direction displacement of the object M may be obtained by integrating the first reference value a, and the obtained displacement may be set as the second reference value b.

When a value corresponding to the differential value of the first reference value a is set as the second reference value b, or in other words when the second reference value b is set to obtain the up-down direction acceleration of the object M, the up-down direction acceleration may be obtained from the aforementioned acceleration sensor, and the obtained acceleration may be set as the second reference value b.

Alternatively, the second reference value b may be obtained by providing a differentiator and differentiating the first reference value a.

Further, to enable detection of a vibration level of an arbitrary frequency band, from among the vibration levels of the detection subject object M, a detection subject frequency component may be extracted from the first reference value a and the second reference value b.

More specifically, the detection subject frequency component of the first reference value a and the second reference value b can be obtained by filtering the first reference value a and second reference value b using a band pass filter or the like. Basically, high-spectral-density vibration of the object M can be extracted by employing a band pass filter that extracts an identical frequency to a natural frequency of the spring mass system constituted by the object M and the spring S.

A band pass filter is capable of extracting only vibration in a specific evaluation subject frequency band, and can therefore be used to remove noise and the like superimposed on the vibration of the object M. However, in a case where the object M vibrates in a single period, for example, the band pass filter may be omitted.

Incidentally, vibration of the object M at an arbitrary frequency may be expressed by a sine wave. An arbitrary frequency component of the first reference value a, i.e. the speed of the object M, can also be expressed by a sine wave. For example, when an arbitrary frequency component of the first reference value a is expressed by sin ωt (where ω is an angular frequency and t is time), $-(1/\omega)$ cos ωt is obtained by integrating sin ωt. Further, when an amplitude of the first reference value a is compared with an amplitude of a resulting integral value, the amplitude of the integral value is $1/\omega$ times the first reference value a.

Hence, when the second reference value b corresponds to the integral value of the first reference value a, respective amplitudes of the first reference value a and the second reference value b can be adjusted (corrected) to equal values by multiplying the value corresponding to the integral value of the first reference value a by ω using the angular frequency ω that matches the frequency extracted by the filter.

Further, when the second reference value b corresponds to the differential value of the first reference value a, the respective amplitudes of the first reference value a and the second reference value b can be adjusted (corrected) to equal values by multiplying the value corresponding to the differential value of the first reference value a by $1/\omega$.

To determine the vibration level r, therefore, the angular frequency ω of the detection subject vibration is used to correct the respective amplitudes of the first reference value a and the second reference value b to identical values. When the second reference value b corresponds to the integral value of the first reference value a, the value corresponding to the integral value of the first reference value a is multiplied by ω, and when the second reference value b corresponds to the differential value of the first reference value a, the value corresponding to the differential value of the first reference value a is multiplied by $1/\omega$.

Figure 4:
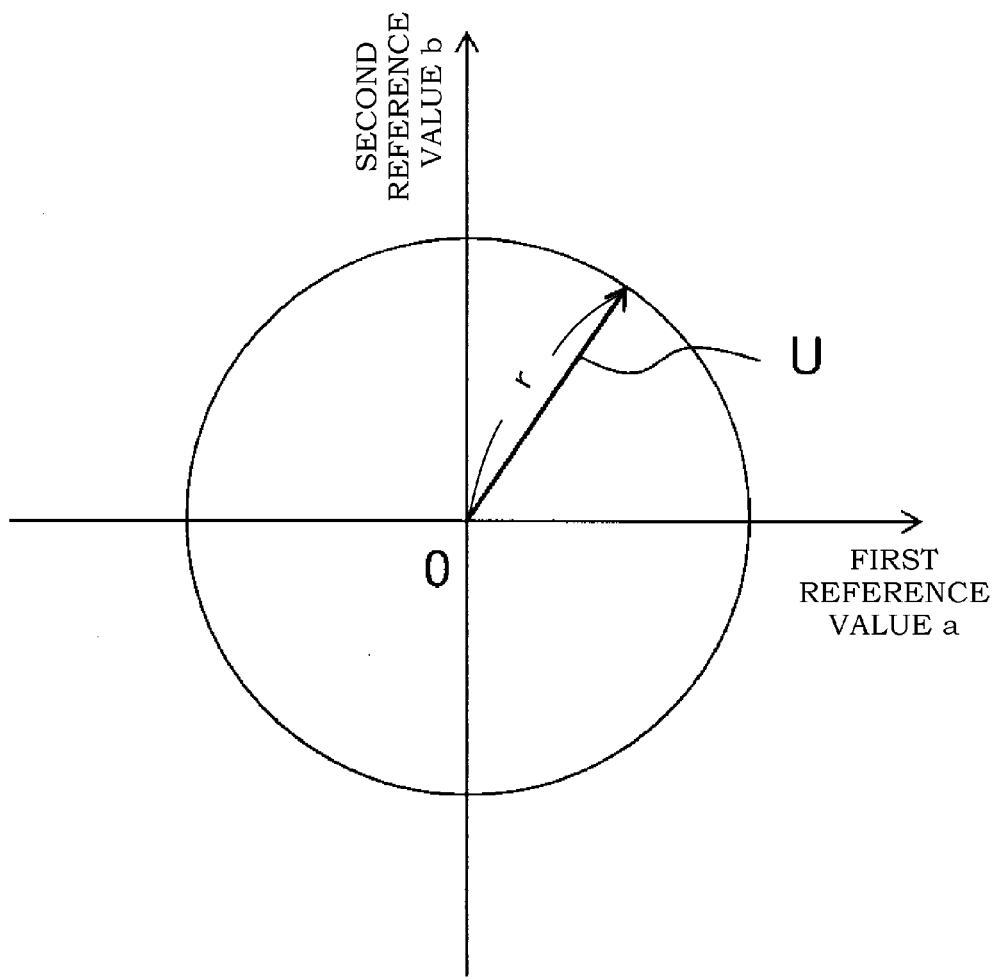
FIG. 4 is a view illustrating a resultant vector of a first reference value and a second reference value.

Next, the first reference value a and second reference value b processed in the manner described above are plotted on orthogonal coordinates, as shown in FIG. 4, whereupon a length of a resultant vector U of the first reference value a and second reference value b plotted on the orthogonal coordinates is calculated and set as the vibration level r.

The length of the resultant vector U corresponds to a value of a square root of a sum of squares of the first reference value a and second reference value b, and can be determined from $(a^2+b^2)^{1/2}$. Alternatively, a root calculation may be omitted such that a value $(a^2+b^2)$ of a sum of squares is determined as the length of the resultant vector U.

Hence, a value from which the length of the resultant vector U can be estimated, or in other words a value having a correlative relationship with the length of the resultant vector U, may be determined and used as the vibration level r. In so doing, a root calculation having a high load can be avoided, and as a result, a calculation time can be shortened.

It should be noted that a value obtained by raising the length of the resultant vector U to the power of z (where z is an arbitrary value) and a value obtained by multiplying the length by an arbitrary coefficient, while not directly matching the length of the resultant vector U, are values from which the length of the resultant vector U can be recognized. Needless to mention, these values may also be used as the vibration level r. In other words, any value from which the length of the resultant vector U can be recognized may be used as the vibration level r.

Here, when the object M is caused to vibrate by up-down movement of the base T or by applying and removing displacement to and from the object M, the spring S expands and contracts such that one energy conversion from an elastic energy of the spring S to a kinetic energy of the object M and the other energy conversion from the kinetic energy of the object M to the elastic energy of the spring S are performed alternately. Therefore, in the absence of outside disturbances, a speed of the object M when the object M is maximally displaced from a neutral position is 0 (zero), and when the object M is in the neutral position, the speed of the object M is at a maximum. It should be noted that the neutral position is a position of the object M when elastically supported by the spring S in a static condition.

The respective amplitudes of the first reference value a and the second reference value b are equalized by the correction procedure described above such that the first reference value a and the second reference value b deviate from each other by a phase difference of 90 degrees. Hence, when the vibration of the object M is not damped such that the object M vibrates repeatedly in an identical manner, a locus formed by the first reference value a and the second reference value b ideally depicts a perfect circle, as shown in FIG. 4. The vibration level r can be understood to be equal to a radius of this circle.

It should be noted that in actuality, it may be impossible to align the respective amplitudes with each other perfectly due to an extraction precision of the filter, outside disturbances acting on the object M, and noise included in the first reference value a, second reference value b, and so on. However, the value of the vibration level r is substantially equal to the radius of the aforementioned circle.

Hence, when the first reference value a representing the speed of the object M is 0, an absolute value of the second reference value b representing the displacement of the object M takes a maximum value, and conversely, when the second reference value b is 0, an absolute value of the first reference value a takes a maximum value. Therefore, when the vibration condition of the object M does not vary, the vibration level r ideally takes a fixed value.

In other words, the vibration level r is a value that serves as an index expressing the vibration amplitude of the object M, and therefore expresses the magnitude of the vibration.

As is evident from the procedures described above, when calculating the vibration level r, there is no need to determine a wave height by sampling one of the displacement, the speed, and the acceleration of the object M within a single period, and only the displacement and speed of the object M need be obtained. Hence, the vibration level r can be determined in a timely fashion. In other words, by detecting the vibration level r in the manner described above, the magnitude of the vibration of the object M can be detected in a timely fashion and in real time.

The vibration level r may also be determined by setting any relationship (combination) from among combinations of the speed and acceleration of the object M, the acceleration and an acceleration variation rate of the object M, and the displacement of the object M and a value corresponding to an integral value of the displacement as the first reference value a and the second reference value b.

Likewise with these settings, the first reference value a and the second reference value b deviate from each other by a phase difference of 90 degrees, and therefore, by adjusting (correcting) the second reference value b using the angular frequency co of the detection subject vibration, the locus obtained when the first reference value a and the second reference value b are plotted on orthogonal coordinates depicts a circle. The radius of the circle depicted on the orthogonal coordinates is determined as the vibration level r, and the vibration level r serves as an index expressing the magnitude of the vibration.

In other words, by setting the first reference value a as any one of the displacement, the speed, and the acceleration in a direction matching a direction of the detection subject vibration of the object M, and setting the second reference value b as a value corresponding to the integral value or the differential value of the first reference value a, the vibration level r of the unsprung member W can be determined.

The first reference value a may be obtained by differentiating or integrating a signal output from a sensor instead of being obtained directly from the sensor.

The second reference value b may be obtained directly from a sensor. For example, instead of obtaining the second reference value b by differentiating or integrating the first reference value a in a case where a value corresponding to the differential value or a value corresponding to the integral value of the first reference value a is set as the second reference value b, a separate sensor may be provided such that the second reference value b is obtained directly from the sensor.

Further, a plurality of vibration levels may be calculated from a combination of different parameters, whereupon the final vibration level r is determined.

For example, in a case where the value corresponding to the integral value of the first reference value a is set as the second reference value b, a value corresponding to the vibration level r may be determined in accordance with the procedures described above using the first reference value a and the second reference value b, and this value may be set as a first vibration level r1.

In addition, the value corresponding to the differential value of the first reference value a is set as a third reference value c, whereupon a value corresponding to the vibration level r is determined in accordance with the procedures described above using the first reference value a and the third reference value c rather than the first reference value a and the second reference value b, and this value is set as a second vibration level r2.

An average value of the first vibration level r1 and the second vibration level r2 is then calculated by adding together the first vibration level r1 and the second vibration level r2 and dividing the result by "2", and the resulting average value may be set as the vibration level r.

In a case where the value corresponding to the differential value of the first reference value a is set as the second reference value b, the value corresponding to the integral value of the first reference value a may be set as the third reference value c.

Figure 5:
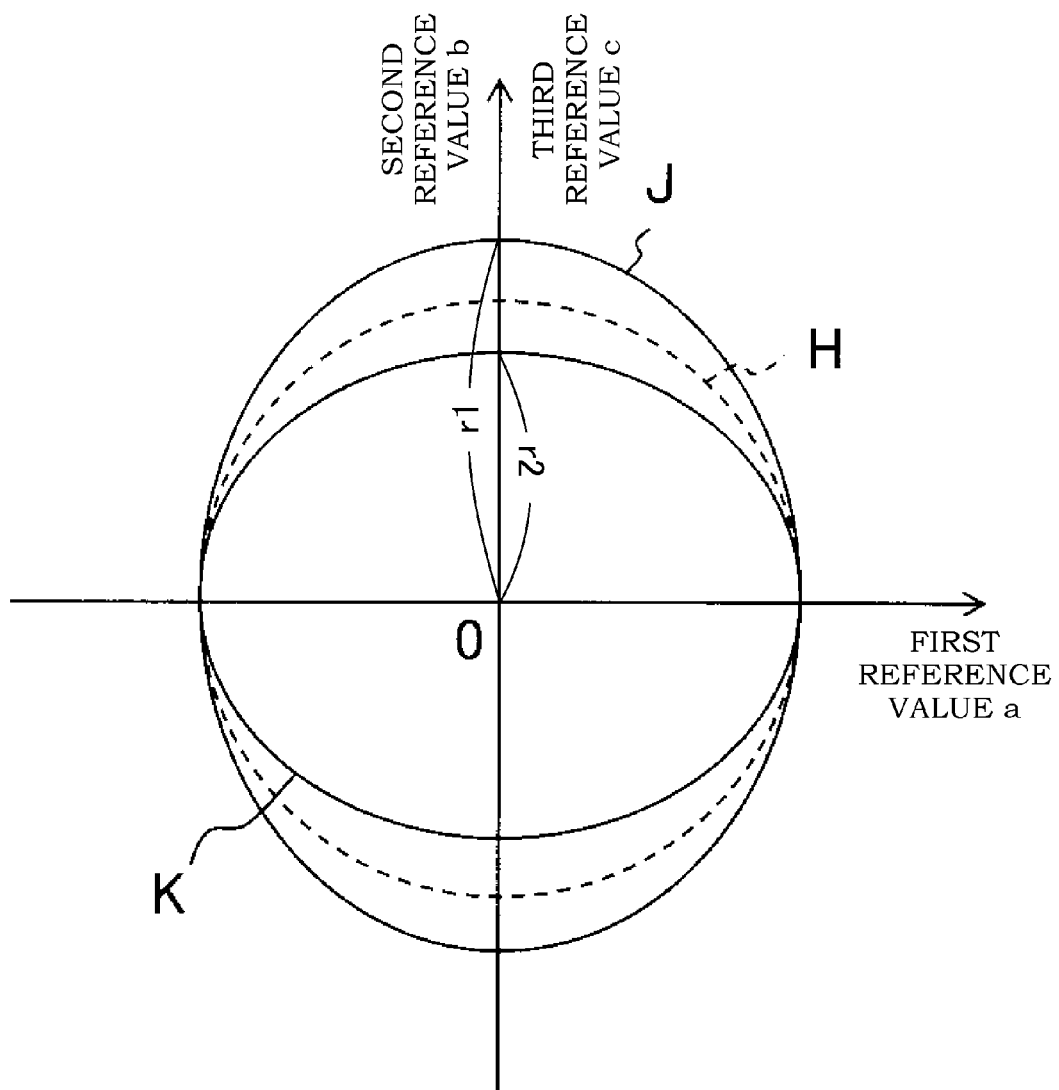
FIG. 5 is a view illustrating a locus of the first reference value and the second reference value and a locus of the first reference value and a third reference value.

The above example will now be described with reference to FIG. 5. As shown in FIG. 5, orthogonal coordinates in which the first reference value a is plotted on the abscissa and the second reference value b and third reference value c are plotted on the ordinate will be considered. A circle H having a maximum value of the first reference value a as a radius is indicated in FIG. 5 by a dotted line.

To determine a vibration level of a detection subject frequency band from among the vibration levels of the object M, the first reference value a, second reference value b, and third reference value c are filtered using a band pass filter, as described above.

In this case, when a deviation occurs between the frequency extracted by the band pass filter and the vibration frequency of the object M such that the first vibration level r1 takes a value equal to or larger than the maximum value of the first reference value a, a locus J of the first reference value a and the second reference value b forms an ellipse that is larger than the circle H. The second vibration level r2, on the other hand, takes a value equal to or smaller than the maximum value of the first reference value a, and therefore a locus K of the first reference value a and the third reference value c forms an ellipse that is smaller than the circle H.

In other words, in a condition where the vibration frequency of the object M and the detection subject vibration frequency do not match, a deviation occurs in the procedures described above between the angular frequency co used during the correction and an actual angular frequency ω'.

Accordingly, a maximum value of the second reference value b following adjustment of the second reference value b corresponding to the integral value of the first reference value a is ω/ω' times the maximum value of the first reference value a, and a maximum value of the third reference value c corresponding to the differential value of the first reference value a following adjustment is ω'/ω times the maximum value of the first reference value a.

Hence, when the first vibration level r1 takes a larger value than the first reference value a, the second vibration level r2 takes a correspondingly smaller value than the first reference value a, and therefore, by averaging the first vibration level r1 and the second vibration level r2 in order to determine the vibration level r, variation in the vibration level r can be absorbed. In other words, an error in the vibration level r can be reduced.

The vibration level r can therefore be determined with stability even when the vibration frequency of the object M and the detection subject vibration frequency do not match, and as a result, a favorable detection result can be obtained in relation to the vibration level r.

Furthermore, when an undulation occurs in the vibration level r and it is known that noise of a frequency component twice as large as the vibration frequency of the object M is superimposed on the vibration level r, the vibration level r may be filtered using a filter that removes the superimposed noise.

An example in which the vibration level r is determined by setting the value corresponding to the integral value of the first reference value a and the value corresponding to the differential value of the first reference value as the second reference value b and the third reference value c, respectively, was described above, but the present invention is not limited to this example.

For example, a vibration level r1 may be determined by setting the displacement of the object M as the first reference value a and setting the speed of the object M as the second reference value b, whereupon a separate, additional vibration level r2 is determined by setting the acceleration of the object M as the first reference value a and setting the acceleration variation rate of the object M as the second reference value b.

An average value of the vibration level r1 obtained from the relationship between the displacement and the speed of the object M and the vibration level r2 obtained from the relationship between the acceleration and the acceleration variation rate of the object M may then be determined as the final vibration level r.

Hence, a plurality of combinations of two parameters used as the first reference value and the second reference value may be set, and on the basis of a plurality of vibration levels obtained from the respective parameters, a value such as an average value of the respective vibration levels, for example, may be obtained as the final vibration level r.

Next, an embodiment in which the vibration level detecting unit 1 is applied to a vehicle to detect the vibration level r of the unsprung member W provided in the vehicle will be described with reference to FIG. 1.

As shown in FIG. 1, the vibration level detecting unit 1 detects the vibration level r of the unsprung member W. The vibration level detecting unit 1 obtains the stroke speed Vd of the damper D, output by the stroke speed detecting unit 2, as the first reference value.

The vibration level detecting unit 1 includes a second reference value acquiring unit 21 that obtains the value corresponding to the differential value of the first reference value as the second reference value, and a third reference value acquiring unit 22 that obtains the value corresponding to the integral value of the first reference value as the third reference value.

Further, the vibration level detecting unit 1 includes a filter 23 that extracts a resonance frequency component of the unsprung member W from the first reference value, second reference value, and third reference value, and an adjustment unit 24 that adjusts the first reference value, second reference value, and third reference value relative to each other. The vibration level detecting unit 1 also includes a vibration level calculating unit 25 that determines the vibration level r of the unsprung member W.

It should be noted that since the first reference value is the stroke speed Vd of the damper D itself, obtained from the stroke speed detecting unit 2, the stroke speed Vd output by the stroke speed detecting unit 2 is input as is into the filter 23.

The stroke speed detecting unit 2 includes a stroke sensor 26 that detects a stroke displacement of the damper D, and a differentiator 27 that calculates the stroke speed Vd of the damper D by differentiating the stroke displacement of the damper D, detected by the stroke sensor 26.

The stroke speed detecting unit 2 sets the detected stroke speed Vd as the first reference value, and outputs the first reference value to the vibration level detecting unit 1.

It should be noted that since, in this embodiment, the stroke speed detecting unit 2 is provided in the damper control apparatus E and the stroke speed Vd detected by the stroke speed detecting unit 2 is used as the first reference value, a first reference value acquiring unit for obtaining the first reference value is not provided in the vibration level detecting unit 1. However, in a case where a sensor is attached to the unsprung member W such that the up-down direction acceleration, speed, or displacement of the unsprung member W is detected directly and used as the first reference value, a first reference value acquiring unit for obtaining a detection signal output by the sensor as the first reference value may be provided.

The second reference value acquiring unit 21 determines a damper acceleration αd, which is a stroke acceleration of the damper D, by differentiating the first reference value, i.e. the stroke speed Vd of the damper D, and sets the damper acceleration αd as the second reference value. The second reference value acquiring unit 21 then outputs the second reference value to the filter 23.

The third reference value acquiring unit 22 determines a damper displacement Xd, which is the stroke displacement of the damper D, by integrating the first reference value, i.e. the stroke speed Vd of the damper D, and sets the damper displacement Xd as the third reference value. It should be noted that since the damper displacement Xd is also detected by the stroke sensor 26, the detected damper displacement Xd may be used as is as the third reference value. The third reference value acquiring unit 22 outputs the third reference value to the filter 23.

The filter 23 filters the stroke speed Vd of the damper D serving as the first reference value, the damper acceleration αd serving as the second reference value, and the damper displacement Xd serving as the third reference value. In this embodiment, the filter 23 extracts only a frequency component in the resonance frequency band of the unsprung member W from the stroke speed Vd, the damper acceleration αd, and the damper displacement Xd of the damper D. As a result, values corresponding respectively to the stroke speed Vd, the damper acceleration αd, and the damper displacement Xd are obtained.

In a case where the first reference value is differentiated and integrated in order to obtain the second reference value and the third reference value when determining the displacement, speed, and acceleration of the unsprung member W, filter processing may be performed using the filter 23 on only the damper displacement Xd prior to acquisition of the first reference value.

In other words, filter processing may be performed directly on the output of the stroke sensor 26, or performed on the first reference value alone before obtaining the second reference value and the third reference value. The first reference value, second reference value, and third reference value obtained in this manner are then adjusted in the adjustment unit 24 using the angular frequency ω that matches the resonance frequency of the unsprung member W.

The vibration level calculating unit 25 calculates the first vibration level r1 from the first reference value and the second reference value, calculates the second vibration level r2 from the first reference value and the third reference value, and determines an average value thereof as the vibration level r of the unsprung member W. The vibration level r of the unsprung member W may be determined from the first reference value and the second reference value without providing the third reference value acquiring unit 22, but by determining the vibration level r using the third reference value acquiring unit 22, a more favorable detection result is obtained in relation to the vibration level r.

In this example, the command value calculating unit 3 adjusts a damping coefficient of the damper D in accordance with a current amount supplied to the damping force adjustment unit 4. The command value calculating unit 3 determines a current value I as the control command value to be applied to the damping force adjustment unit 4 from the vibration level r determined in the manner described above and the stroke speed Vd detected by the stroke speed detecting unit 2. The driving unit 5 includes a PWM (Pulse Width Modulation) circuit or the like, for example, and supplies a current amount corresponding to the current value I determined by the command value calculating unit 3 to the damping force adjustment unit 4.

Figure 6:
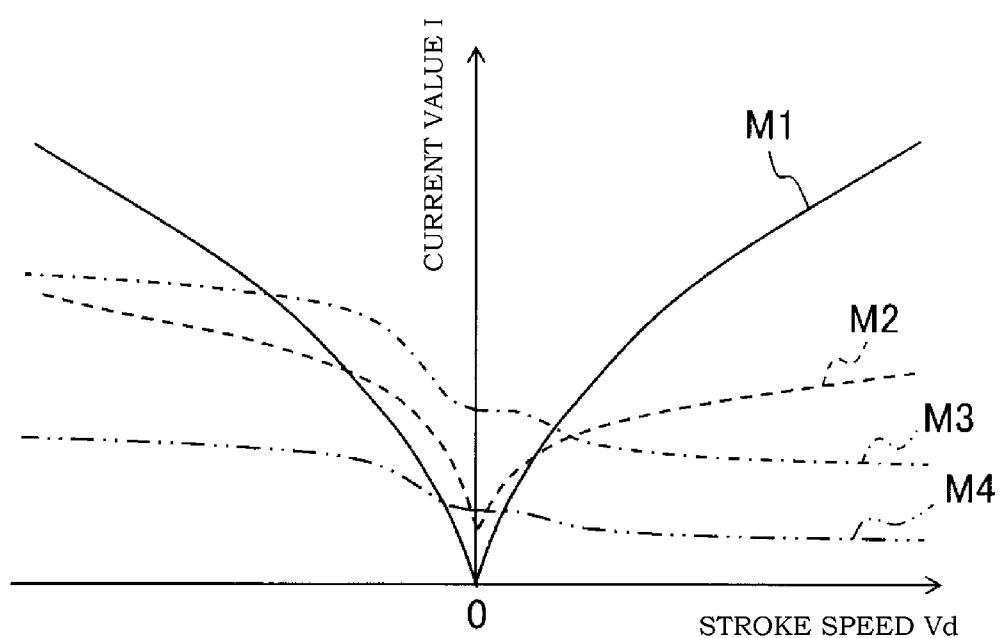
FIG. 6 is a view showing example of maps set in a command value calculating unit.

More specifically, the command value calculating unit 3 holds a plurality of maps representing a relationship between the stroke speed Vd and the current value I serving as variable parameters. As shown in FIG. 6, for example, maps M1 to M4 determined for respective vibration levels r of the unsprung member W are stored in the command value calculating unit 3.

The command value calculating unit 3 selects a map on the basis of the vibration level r calculated by the vibration level calculating unit 25, and performs a map calculation from the stroke speed Vd detected by the stroke speed detecting unit 2 while referring to the selected map. In the map calculation, the command value calculating unit 3 calculates the current value I associated with the detected stroke speed Vd from the selected map, and outputs a control command to the driving unit 5 to cause the driving unit 5 to output a current corresponding to the current value I to the damping force adjustment unit 4.

The plurality of maps held by the command value calculating unit 3 are basically set such that as the vibration level r increases, an incline of a characteristic between the control command value relating to the damper D and the stroke speed Vd steadily increases.

More specifically, the vibration level r is classified as "high", "medium", "low", and "0" according to the magnitude of the vibration level r, and maps corresponding to the respective classifications are prepared.

For example, when the detected vibration level r is classified as "high", the command value calculating unit 3 selects the map M1 corresponding to the "high" classification from the group of maps M1 to M4 shown in FIG. 6, and determines the current value I serving as the control command value from the stroke speed Vd using the selected map M1.

Similarly, when the vibration level r is classified as "medium", the command value calculating unit 3 selects the map M2 corresponding to the "medium" classification from the group of maps, and determines the current value I from the stroke speed Vd using the selected map M2.

Further, when the vibration level r is classified as "low", the command value calculating unit 3 selects the map M3 corresponding to the "low" classification from the group of maps, and determines the current value I from the stroke speed Vd using the selected map M3.

Furthermore, when the vibration level r is classified as "0", the command value calculating unit 3 selects the map M4 corresponding to the "0" classification from the group of maps, and determines the current value I from the stroke speed Vd using the selected map M4.

The classifications of the vibration level r may be set as desired. For example, the vibration level r may be set in the "0" classification when the value thereof is 0, in the "low" classification when the value thereof is $0<r<0.3$, in the "medium" classification when the value thereof is $0.3 \leq r<0.6$, and in the "high" classification when the value thereof is $0.6 \leq r$.

Alternatively, instead of classifying the vibration level r, maps from which optimum current values I can be determined may be prepared in advance respectively for cases in which the vibration level r is "0", "0.1", "0.3", and "0.6", for example.

For example, when the vibration level r is 0.4, the current value I may be determined by performing a linear interpolation using two maps, namely the optimum map when the vibration level r is "0.3" and the optimum map when the vibration level r is "0.6". In other words, current values I may be determined respectively from the maps for the 0.3 vibration level and the 0.6 vibration level, and the current value I for a vibration level r of 0.4 may then be determined from these current values I.

Further, on the maps M1, M2, M3, M4, a contraction side characteristic of the damper D, in which the stroke speed Vd takes a positive value, and an expansion side characteristic of the damper D, in which the stroke speed Vd takes a negative value, are asymmetrical.

Furthermore, in an expansion side range and a contraction side range of the maps M1, M2, M3, the incline of the map is set to increase steadily as the vibration level r increases. Moreover, the current value I (a value of an intercept on the characteristic lines of the maps M1, M2, M3) of the map in a case where the stroke speed Vd is 0 is set to become steadily larger as the vibration level r increases.

The maps M1, M2, M3, M4 may be set such that the contraction side characteristic of the damper D, in which the stroke speed Vd takes a positive value, and the expansion side characteristic of the damper D, in which the stroke speed Vd takes a negative value, are symmetrical. The maps M1, M2, M3, M4 may be set optimally in accordance with the vehicle in which the damper control apparatus E is installed.

Further, the map M3 is used in a condition where the vibration level r is small such that the damper D vibrates slightly. On the map M3, the current value I is set at a predetermined value larger than that of the other maps such as the map M2 so that when the stroke speed Vd is in transition in the vicinity of 0 (zero), the damper D is actively caused to generate a damping force. In so doing, throbbing vibration of the unsprung member W can be sufficiently suppressed. As a result, throbbing vibration is not transmitted to vehicle passengers.

The map M4 is selected when the vibration level r is 0. If the current value I is set similarly to that of the map M3 when the vibration level r is 0, the damping force generated when the stroke speed Vd of the damper D is in the vicinity of 0 becomes too large, and as a result, a jiggling is transmitted to the vehicle passengers, leading to a reduction in passenger comfort. The jiggling is constituted by small up-down vibratory movements caused by overdamping in a frequency band between sprung mass resonance and unsprung mass resonance.

To solve this problem, on the map M4, the current value I employed when the stroke speed Vd is in the vicinity of 0 is set at a predetermined value at which this jiggling can be suppressed, or in other words at a smaller current value than that of the map M3.

Hence, the command value calculating unit 3 calculates the current value I serving as the control command value for the damper D on the basis of the vibration level r and the stroke speed Vd by referring to the maps M1 to M4, and outputs the calculated current value I to the driving unit 5. The driving unit 5 supplies a current to the damping force adjustment unit 4 of the damper D in accordance with the current value I.

The damping force adjustment unit 4 adjusts the damping coefficient of the damper D upon reception of a current amount corresponding to the current value I from the driving unit 5. As a result, a damping force can be generated by the damper D in accordance with the stroke speed Vd.

The damping force of the damper D is controlled by the damper control apparatus E in the manner described above.

Moreover, the vibration level detecting unit 1 of the damper control apparatus E can detect the vibration level r in a timely fashion and in real time. As a result, a time delay between the occurrence of vibration in the object and detection of the vibration level r can be reduced, and therefore the damper control apparatus E is sufficiently suitable for use in suppressing vehicle vibration.

As described above, the damper control apparatus E controls the damping force of the damper D by selecting the map M1, M2, M3, M4 in accordance with the magnitude of the vibration level r of the unsprung member W, and determining the current value I to be applied to the damping force adjustment unit 4 from the selected map and the stroke speed Vd. In so doing, as shown in FIG. 7, for example, the damper control apparatus E can cause the damper D to generate a damping force having an optimum damping characteristic in accordance with the vibration level r.

Figure 7:
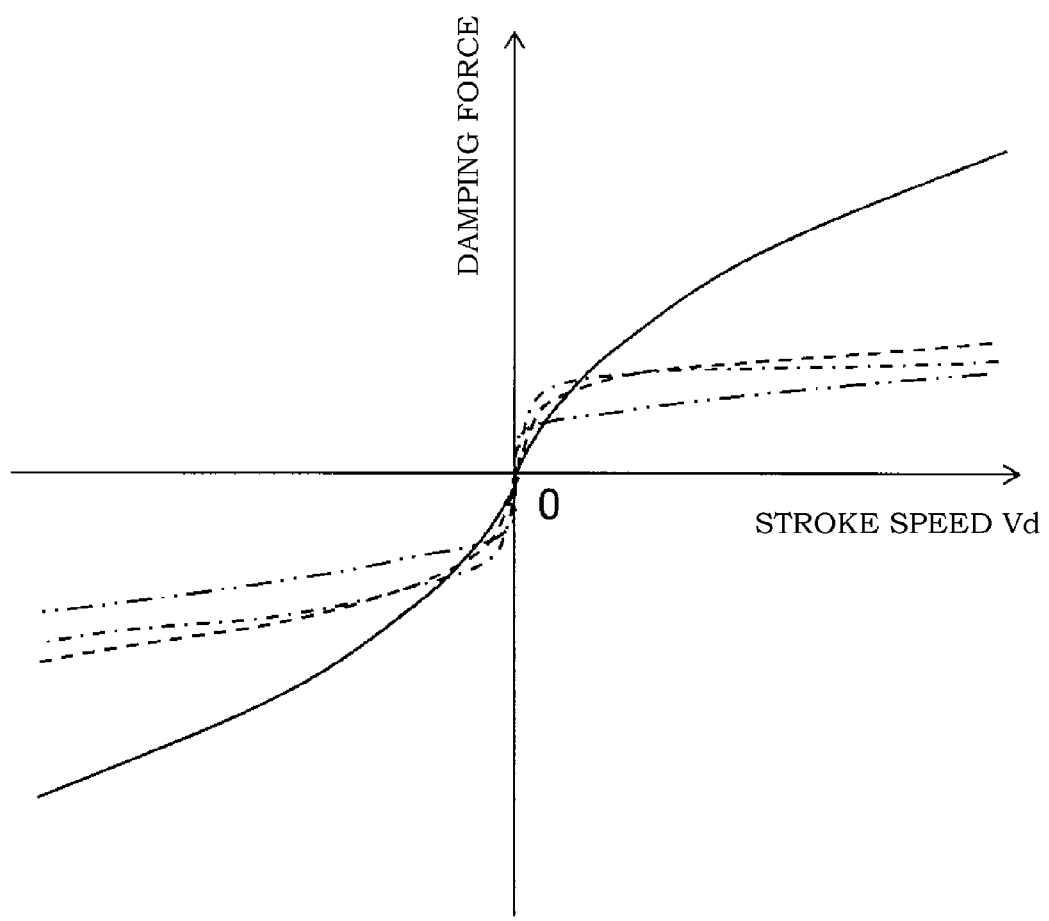
FIG. 7 is a view showing damping characteristics of a damper at respective vibration levels of the unsprung member.

A characteristic indicated by a solid line in FIG. 7 is a damping characteristic obtained when the map M1 is selected, and a characteristic indicated by a dotted line in FIG. 7 is a damping characteristic obtained when the map M2 is selected. Further, a characteristic indicated by a dot-dash line in FIG. 7 is a damping characteristic obtained when the map M3 is selected, and a characteristic indicated by a dot-dot-dash line in FIG. 7 is a damping characteristic obtained when the map M4 is selected.

When the vibration level r is low, medium, or high, the damping coefficient increases in accordance with the magnitude of the vibration level r such that the damping characteristic of the damper D is optimum for the vibration level r. Additionally, a damping force obtained when an absolute value of the stroke speed Vd is in the vicinity of 0 decreases as the vibration level r increases, and therefore the passenger comfort of the vehicle can be improved while avoiding rapid variation in the damping force during a switch in the damper D between expansion and contraction.

Furthermore, in a condition where the vibration level r is small such that the damper D vibrates slightly, the map M3 is selected so that when the stroke speed Vd is in transition in the vicinity of 0, the damping force generated by the damper D is increased. In so doing, throbbing vibration in the unsprung member W can be suppressed sufficiently so that throbbing vibration is not transmitted to the vehicle passengers. Moreover, when the vibration level r is 0, the map M4 is selected such that the current value I is suppressed, and therefore a jiggling in a lower frequency band than the throbbing vibration is not transmitted to the vehicle passengers. As a result, a reduction in passenger comfort does not occur.

As described above, the damper control apparatus E includes the vibration level detecting unit 1 configured to detect the vibration level r, the vibration level r serving as the magnitude of the vibration of the unsprung member W, the stroke speed detecting unit 2 configured to detect the stroke speed Vd of the damper D, and the command value calculating unit 3 that determines the control command value I on the basis of the vibration level r and the stroke speed Vd.

Accordingly, an optimum control command value can be determined in accordance with the magnitude of the vibration, and damping force control corresponding to the magnitude of the vibration of the unsprung member W can be performed. As a result, passenger comfort in the vehicle can be improved.

Further, with the damper control apparatus E according to this embodiment, when the vibration level r is high, the incline of the characteristic between the control command value and the stroke speed Vd increases.

Accordingly, the control command value generated when the stroke speed Vd is in the vicinity of 0 decreases, and therefore rapid variation in the damping force during a switch in the damper D between expansion and contraction can be alleviated. Hence, noise generated in a vehicle cabin when vibration is applied to a vehicle body, as well as shock exerted on the vehicle body, can be avoided so that the vehicle passengers do not experience discomfort. As a result, the passenger comfort of the vehicle can be improved even further.

Furthermore, with the damper control apparatus E according to this embodiment, as the vibration level r decreases, the incline of the characteristic between the control command value and the stroke speed Vd decreases, and therefore the vibration of the unsprung member W can be damped reliably when the stroke speed Vd increases, leading to an increase in the vibration level r. Conversely, in a case where the vibration level r is high, the damping force of the damper D does not become excessively large when the stroke speed Vd is in a low speed region, and when the stroke speed Vd is in a high speed region, passenger comfort in the vehicle can be improved.

Moreover, the damper control apparatus E is configured to hold the plurality of maps each representing the relationship between the current value I serving as the control command value and the stroke speed Vd in this embodiment. The command value calculating unit 3 selects one or two maps from the plurality of maps on the basis of the vibration level r, and determines the current value I on the basis of the selected map and the stroke speed Vd. As a result, the current value I serving as the control command value can be determined extremely easily.

Figure 8:
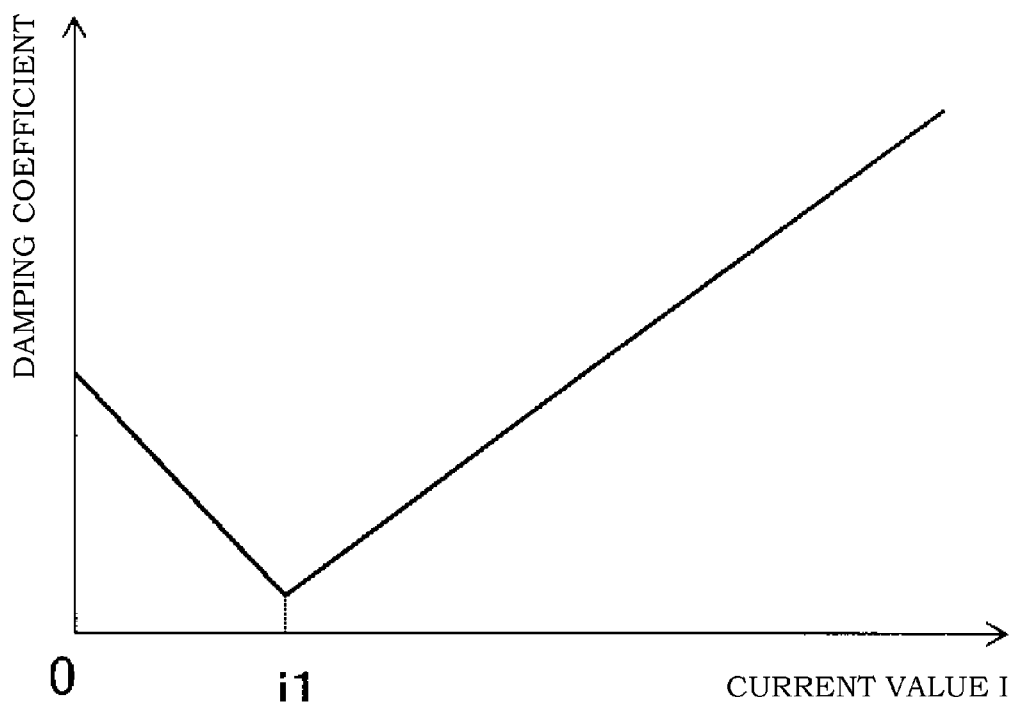
FIG. 8 is a view showing a relationship between a current amount and a damping coefficient, which is stored in a damping force adjustment unit.

Furthermore, to ensure, as a failsafe, that a certain degree of damping force is generated when the current value supplied to the damping force adjustment unit 4 is 0, the damping force adjustment unit 4 may be designed so that a relationship between the value of the current actually supplied to the damping force adjustment unit 4 and the damping coefficient of the damper D is as shown in FIG. 8, for example.

In FIG. 8, this relationship is set so that when the current value is 0, the damping coefficient takes a larger value than 0, when the current value is i1, the damping coefficient takes a minimum value, and in a range where the current value exceeds i1, the damping coefficient increases in proportion with the amount by which the current value exceeds i1.

The current value I employed when the vibration level r is 0 may be determined at a value equal to or greater than the current value i1 after checking a balance between the current value I and the comfort of the vehicle passengers, and a map having an intercept according to which the current value I increases as the vibration level r increases may be set from the determined current value. Further, in a case where the damping coefficient of the damper D is reduced steadily as the current amount supplied to the damping force adjustment unit 4 increases, a map on which the current value I decreases as the vibration level r increases may be set. In other words, the maps may be set as desired in accordance with the design of the damping force adjustment unit 4.

Although not shown in the figures, it should be noted that the damper control apparatus E according to this embodiment includes, as hardware resources, an A/D converter for taking in the signals output by the sensor units, and a storage apparatus such as a ROM (Read Only Memory) storing a program used in the processing required to detect the vibration level r and calculate the current value I, for example. The damper control apparatus E may further include a calculation apparatus such as a CPU (Central Processing Unit) that executes the processing based on the program, and a storage apparatus such as a RAM (Random Access Memory) that provides the CPU with a storage area. Operations of the vibration level detecting unit 1 and the command value calculating unit 3 may be realized by having the CPU of the damper control apparatus E execute the program.

In the above description, the current value I applied to the damping force adjustment unit 4 is used as the control command value, but a damping force target value to be generated by the damper D may be used as the control command value instead. In this case, the damper D may be caused to generate a damping force corresponding to the damping force target value by converting the damping force target value into a current command and applying the current command to the damping force adjustment unit 4. In this case, a relationship between the stroke speed and the damping force target value may be plotted on a map and used in place of the map representing the relationship between the stroke speed and the control command value.

Furthermore, in the above description, the control command value is determined using a map, but the control command value may be determined using a function having the vibration level r and the stroke speed Vd as parameters. In this case, the damper control apparatus E need not execute a map calculation, and therefore the plurality of maps representing the relationship between the control command value and the stroke speed Vd need not be held in the damper control apparatus E.

Alternatively, the vibration level r of the unsprung member W may be detected by providing the stroke sensor 26 in the damper D, as shown in FIG. 1, for example, and setting one parameter from the relative displacement between the cylinder 12 and the piston rod 14, detected by the stroke sensor 26, a relative speed obtained by differentiating the relative displacement, and a relative acceleration obtained by differentiating the relative speed as the first reference value a. Then, by extracting a component that matches the resonance frequency of the unsprung member W from the first reference value a using the filter 23, one of the displacement, the speed, and the acceleration of the unsprung member W in the up-down direction can be obtained. Furthermore, a sensor may be attached to the unsprung member W such that the up-down direction acceleration of the unsprung member W is detected directly, and this acceleration may be used to determine the first reference value.

When detecting the vibration level r of the unsprung member W, the third reference value may be obtained on the basis of the first reference value in addition to the first reference value and the second reference value. The final vibration level r may then be determined by calculating the first vibration level on the basis of the first reference value and the second reference value and calculating the second vibration level on the basis of the first reference value and the third reference value.

An embodiment of the present invention was described above, but the above embodiment is merely one example of an application of the present invention, and the technical scope of the present invention is not limited to the specific configurations of the above embodiment.

This application claims priority based on Tokugan 2013-050130, filed with the Japan Patent Office on Mar. 13, 2013, the entire contents of which are incorporated into this specification by reference.

The invention claimed is:

1. A damper control apparatus for damping vibration of an unsprung member by controlling a damping force of a damper in a vehicle, the damper being interposed between a sprung member and the unsprung member, the damper control apparatus comprising:
   a vibration level detecting unit configured to detect a vibration level, the vibration level serving as a magnitude of vibration of the unsprung member;
   a stroke speed detecting unit configured to detect a stroke speed of the damper;
   a command value calculating unit configured to so determine a control command value that an incline of a characteristic line between the control command value and the stroke speed of the damper increases as the vibration of the unsprung member increases, the control command value being a command value for controlling the damping force of the damper; and
   a driving circuit configured to output current to control the damping force in accordance with the control command value determined by the command value calculating unit.

2. The damper control apparatus as defined in claim 1, wherein the damper control apparatus is configured to hold a plurality of maps each representing a relationship between the control command value and the stroke speed, and
   wherein the command value calculating unit selects a map from the plurality of maps on the basis of the vibration level of the unsprung member, and determines the control command value on the basis of the selected map and the stroke speed detected by the stroke speed detecting unit.

3. The damper control apparatus as defined in claim 1, wherein the vibration level detecting unit includes:
   a first reference value acquiring unit configured to obtain a value of one parameter from at least a displacement, a speed, and an acceleration of the unsprung member as a first reference value;
   a second reference value acquiring unit configured to obtain a second reference value, the second reference value corresponding to a differential value or an integral value of the first reference value obtained by the first reference value acquiring unit; and
   a vibration level calculating unit configured to determine the vibration level of the unsprung member on the basis of the first reference value and the second reference value.

4. The damper control apparatus as defined in claim 3, wherein the vibration level calculating unit determines the vibration level on the basis of a value from which a length of a resultant vector can be recognized, the resultant vector being obtained on the basis of the first reference value and the second reference value when the first reference value and the second reference value are plotted on orthogonal coordinates.

5. A damper control apparatus for damping vibration of an unsprung member by controlling a damping force of a damper in a vehicle, the damper being interposed between a sprung member and the unsprung member, the damper control apparatus comprising:
   a vibration level sensor configured to detect a vibration level, the vibration level serving as a magnitude of vibration of the unsprung member;

a stroke speed sensor configured to detect a stroke speed of the damper;

a central processing unit (CPU) configured to so determine a control command value that an incline of a characteristic line between the control command value and the stroke speed of the damper increases as the vibration of the unsprung member increases, the control command value being a command value for controlling the damping force of the damper; and a driving circuit configured to output current to control the damping force in accordance with the control command value determined by the CPU.

6. The damper control apparatus as defined in claim 5, wherein the damper control apparatus is configured to hold a plurality of maps each representing a relationship between the control command value and the stroke speed, and the CPU selects a map from the plurality of maps on the basis of the vibration level of the unsprung member, and determines the control command value on the basis of the selected map and the stroke speed detected by the stroke speed sensor.

7. The damper control apparatus as defined in claim 5, wherein the vibration level sensor includes a first reference value sensor configured to obtain a value of one parameter from at least a displacement, a speed, and an acceleration of the unsprung member as a first reference value, and a second reference value sensor configured to obtain a second reference value, the second reference value corresponding to a differential value or an integral value of the first reference value obtained by the first reference value sensor; and the CPU is configured to determine the vibration level of the unsprung member on the basis of the first reference value and the second reference value.

8. The damper control apparatus as defined in claim 7, wherein the CPU determines the vibration level on the basis of a value from which a length of a resultant vector can be recognized, the resultant vector being obtained on the basis of the first reference value and the second reference value when the first reference value and the second reference value are plotted on orthogonal coordinates.

9. A damper control apparatus for damping vibration of an unsprung member by controlling a damping force of a damper in a vehicle, the damper being interposed between a sprung member and the unsprung member, the damper control apparatus comprising:

a vibration level sensor configured to detect a vibration level, the vibration level serving as a magnitude of vibration of the unsprung member;

a stroke speed sensor configured to detect a stroke speed of the damper;

a central processing unit (CPU) configured to determine a control command value on the basis of the vibration level of the unsprung member and the stroke speed of the damper, the control command value being a command value for controlling the damping force of the damper; and a driving circuit configured to output current to control the damping force in accordance with the control command value determined by the CPU.

10. The damper control apparatus as defined in claim 9, wherein the damper control apparatus is configured to hold a plurality of maps each representing a relationship between the control command value and the stroke speed, and the CPU selects a map from the plurality of maps on the basis of the vibration level of the unsprung member, and determines the control command value on the basis of the selected map and the stroke speed detected by the stroke speed sensor.

11. The damper control apparatus as defined in claim 9, wherein the vibration level sensor includes a first reference value sensor configured to obtain a value of one parameter from at least a displacement, a speed, and an acceleration of the unsprung member as a first reference value, and a second reference value sensor configured to obtain a second reference value, the second reference value corresponding to a differential value or an integral value of the first reference value obtained by the first reference value sensor; and the CPU is configured to determine the vibration level of the unsprung member on the basis of the first reference value and the second reference value.

12. The damper control apparatus as defined in claim 11, wherein the CPU determines the vibration level on the basis of a value from which a length of a resultant vector can be recognized, the resultant vector being obtained on the basis of the first reference value and the second reference value when the first reference value and the second reference value are plotted on orthogonal coordinates.

13. The damper control apparatus as defined in claim 9, wherein the CPU determines the control command value so that an incline of a characteristic line between the control command value and the stroke speed of the damper increases as the vibration of the unsprung member increases.

* * * * *